Feb. 22, 1966 G. G. ENSIGN 3,237,054

MAGNETIC SPEED REGULATOR

Filed May 15, 1962 2 Sheets-Sheet 1

INVENTOR:
George G. Ensign,
BY
Louis Bernat
ATTORNEYS.

MAGNETIC SPEED REGULATOR

Filed May 15, 1962 2 Sheets-Sheet 2

INVENTOR:
George G. Ensign,
BY
Louis Bernat
ATTORNEYS.

United States Patent Office 3,237,054

Patented Feb. 22, 1966

3,237,054

MAGNETIC SPEED REGULATOR

George G. Ensign, Elgin, Ill., assignor to Elgin National Watch Company, Elgin, Ill., a corporation of Illinois Filed May 15, 1962, Ser. No. 196,553
1 Claim. (Cl. 317—5)

This invention relates generally to improvements in rotational speed regulating apparatus, and more particularly to new and improved magnetically controlled regulating apparatus of the type adapted to govern the speed of a rotating member in a precise and reliable fashion.

Many efforts have been made in the prior art to provide accurate control of the rotational speed of a member, such as a phonograph turn table, a tape capstan, a clock mechanism, and the like. Generally, such prior art efforts have utilized mechanical means for speed control which have the disadvantage of frictional and other loading effects upon the rotating member, or electrical means for speed control which has the disadvantage of relatively complex and expensive circuitry.

Accordingly, it is a general object of this invention to provide new and improved apparatus for regulating rotional speed which overcomes the difficulties of the prior art devices.

More particularly, it is an object of this invention to provide unique magnetically operable regulating apparatus for controlling the speed of a rotating member.

It is another object of this invention to provide such novel rotational speed regulating apparatus which comprises a regulator or governor utilizing a magnetic locking principle, to control variations in the speed of the rotating shaft upon which the rotating member is mounted.

It is still another object of this invention to provide a unique magnetic locking governor which comprises a particularly shaped magnetic cam coupled to the rotating shaft for rotation therewith, and an oscillator assembly magnetically coupled to the cam and adapted to oscillate at a selected frequency for controlling variations in the rotational speed of the shaft and cam.

It is a further object of this invention to provide such a unique magnetic locking speed governor, as above, wherein the oscillator assembly is formed of a magnet and pole piece sub-assembly positioned adjacent opposing faces of the magnetic cam for magnetic coupling therewith, and a torsion spring for mounting the sub-assembly for oscillation at its natural frequency.

It is a still further object of this invention to provide such a unique magnetic locking speed governor, as above, which further comprises a selectively adjustable means for tuning the oscillator assembly by varying its natural frequency of oscillation.

It is a still further object of this invention to provide a new and improved magnetic speed regulator which is characterized by its relatively simple construction and operation and by its high degree of accuracy and reliability.

The novel features which are characteristic of the invention are set forth with particularly in the appended claim. The invention itself, however, both as to its organization and method of operation together with further objects and advantages thereof, will best be understood by reference to the following description taken in conjunction with the accompanying drawings in which:

Figures 1, 2:
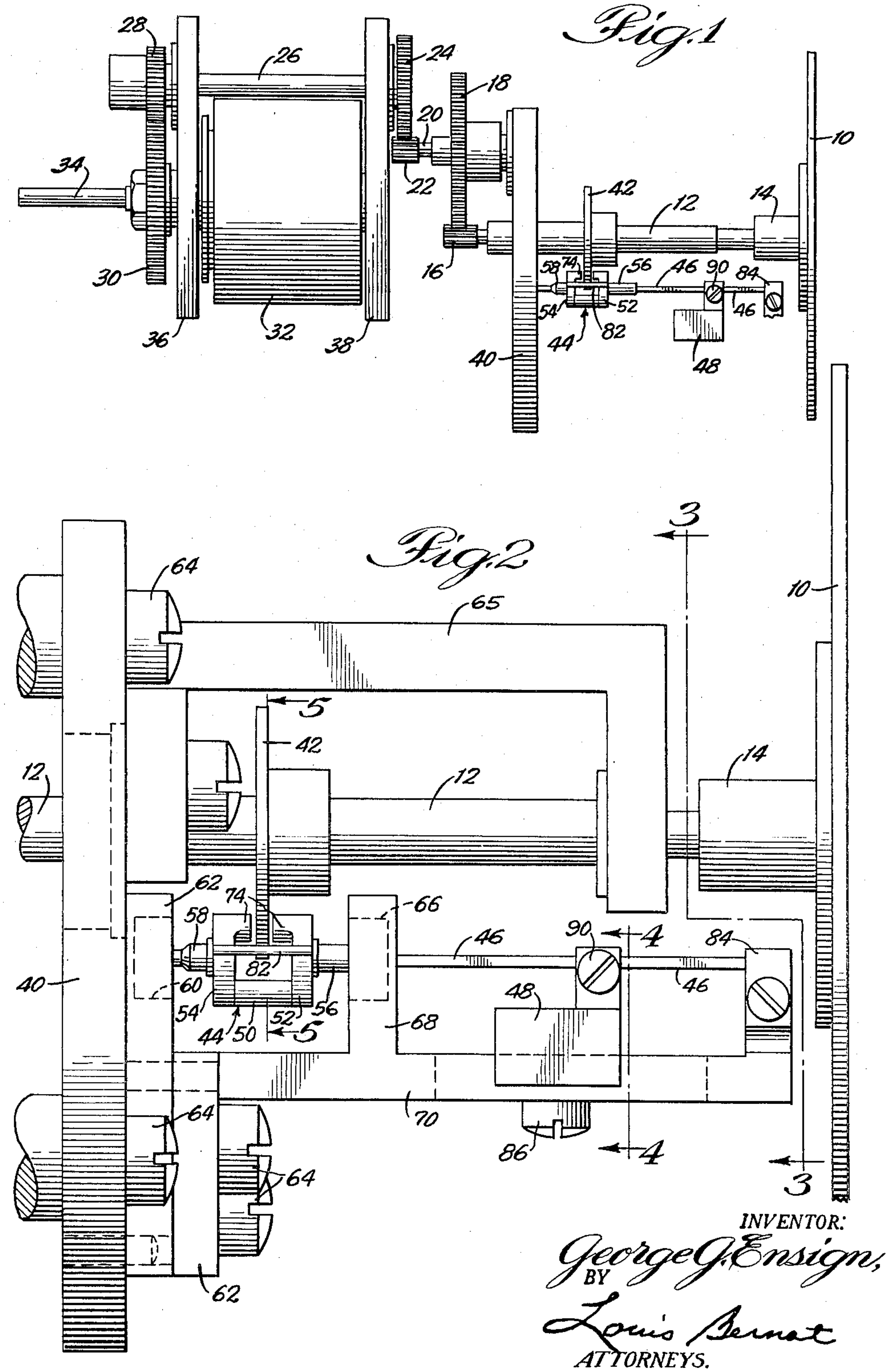
FIGURE 1 is an illustrative view, in generally schematic form, showing one preferred embodiment of the invention.
FIGURE 2 is an elevational view illustrating in greater detail the magnetic cam and oscillator sub-assembly of the magnetic speed regulator embodiment of FIGURE 1.

Referring now to the drawing, and more particularly to FIGURE 1 thereof, there is illustrated one preferred illustrative embodiment of a magnetic speed regulator which incorporates the principles and advantages of the present invention. Although for purposes of explanation, the invention is shown as a rotating disk mechanically coupled to a drive motor by means of a shaft having the magnetic cam of the invention positioned thereon, those skilled in the art will readily appreciate that this particular illustrative embodiment is only one of many rotary mechanisms with which the invention may be used for accurate and reliable speed regulation.

Referring now to FIGURE 1 of the drawing, there is illustrated one specific illustrative embodiment of the invention which comprises a disk 10, the rotation of which is to be controlled by the invention. The disk 10 may be any suitable rotatable member adapted to rotate at a closely regulated speed, as for example, a phonograph turn table, a tape capstan, a chopper disk for the periodic interruption of light beams, or the like. The disk 10 is mounted for rotation on an output shaft 12 as by means of a suitable hub member 14 secured to the shaft 12 at one end and to the disk 10 at its other end.

The output shaft 12 may be rotated by any suitable drive motor source, and the invention is not limited to any particular spring motor, since the driving source does not form a specific part of the magnetic regulator invention. Thus, in the illustrative embodiment, the rotatable output shaft 12 is coupled through the pinion 16 to the gear 18, which in turn is coupled by means of the shaft 20 to the pinion 22. The pinion 22 is meshed with the gear 24 which is coupled through the shaft 26 to the pinion 28. Pinion 28 is meshed with the gear 30, which in turn is coupled to the rotor of the drive motor 32. Those skilled in the art will appreciate that the drive motor 32 may be an electrically operated motor, or a mechanical motor such as a motor of the spring driven type suitable for furnishing power to the rotating disk 10 through the gears and shafts of the transmission system.

In the particular embodiment of FIGURE 1, the motor power is transmitted through a step-up gearing system for the purpose of stepping up the speed from the motor drive shaft to the output shaft 12 for rotating the disk 10 at a desired rotational speed. Manifestly, the rotatable disk 10 may be coupled to the driving motor 32 through any desirable transmission system, either step-up or step-down, without departing from the principles of the present invention.

Further, as shown in FIGURE 1, the support plates 36 and 38 are provided adjacent the opposing ends of the motor 32 to provide mounting means and bearing supports for the motor and the rotatable members. Also, the plate 40 is provided to furnish mounting means and bearing support for the gear 18, pinion 16 and the output shaft 12.

In accordance with a feature of the present invention, a cam member 42 is mounted on the output shaft 12 for rotation therewith. As explained in greater detail hereinbelow, cam member 42 advantageously is provided with a magnetic rim which interacts with a magnetic oscillator 44 to control the speed of the output shaft holding the disk within limits defined by the oscillator frequency. Advantageously, the oscillator unit comprises a magnet sub-assembly formed of a magnet having a pole piece attached to opposite poles thereof, which pole pieces are positioned in closely spaced relation to opposing faces of the magnetic rim on cam 42. The magnetic oscillator 44 is mounted on suitable pivots or bearings for oscillation at its natural frequency, and in accordance with the still further feature of this invention, this natural frequency of oscillation may be varied as desired by means of a torsion spring 46 secured to the oscillator 44 and an adjustable block 48 which is slidably positioned relative to the torsion spring 46 and which may be adjusted to vary the effective length of the torsion spring. As this explanation proceeds, it will be appreciated that the selective adjustment of the torsion spring length serves to vary the natural frequency of oscillation of the magnetic oscillator 44 so that the rotating disk 10 may be controlled and regulated at a desirable rotation speed.

The oscillator assembly is shown in greater detail in FIGURES 2 through 6 of the drawing, wherein the construction of one illustrative embodiment of the invention is disclosed. Advantageously, the magnetic oscillator sub-assembly may be comprised of a magnet member 50 having a pole piece secured to each pole thereof. Thus, the pole piece 52 is secured to one pole of magnet 50 while the pole piece 54 is secured to the other pole of magnet 50, with the pole pieces extending upwardly from the magnet to define a channel therebetween capable of receiving the cam 42 without contacting the pole pieces. It has been found advantageous to form the magnet 50 from a platinum-cobalt material, and to form the pole pieces 52 and 54 from a soft iron material, the properties of these materials being well-known to those skilled in the art. When the oscillator is assembled, the pole pieces 52 and 54 are secured to pivot shaft 56 and 58, respectively for enabling the oscillator to freely oscillate with a minimum of friction in response to the rotation of the cam 42. Towards this end, a bearing support 60 is provided in the oscillator end plate 62, which oscillator end plate is fastened to the plate 40 by any suitable means such as the screw fasteners 64.

In addition, a bearing support 66 is provided for the oscillator staff 56 in a wall 68 of the oscillator support bracket 70. The bearing supports 60 and 66 permit the oscillator assembly 44 to freely oscillate in response to the rotation of cam 42 at a natural frequency determined by the torsion spring adjustment, to be described hereinbelow.

The oscillator bracket 70 advantageously is formed of a suitable non-magnetic material such as brass, and is fastened to the oscillator end plate 62 by suitable fastening means, such as the screw fasteners 64.

Figures 3, 4, 5, 6:
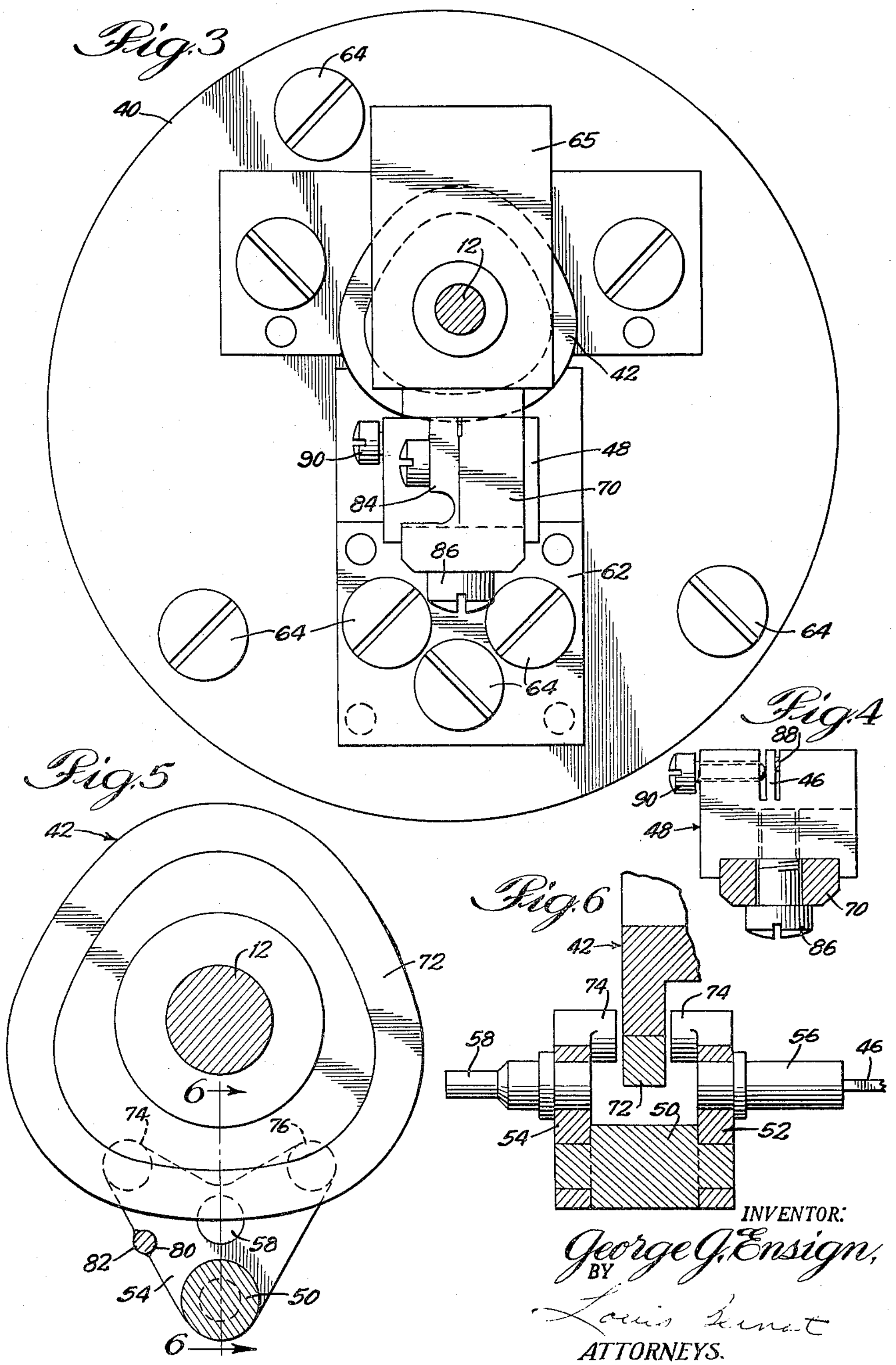
FIGURE 3 is an end cross-sectional view, taken substantially as shown along line 3—3 of FIGURE 2.
FIGURE 4 is a cross-sectional view of the torsion spring and adjustment means taken substantially as shown along line 4—4 of FIGURE 2.
FIGURE 5 is an end cross-sectional view of the magnetic cam and oscillator sub-assembly taken substantially as shown along line 5—5 of FIGURE 2.
FIGURE 6 is a cross-sectional view of the magnetic cam and magnetic pole piece construction taken substantially as shown along line 6—6 of FIGURE 5.

Advantageously, the cam member 42 is formed with a configuration having the curve which is required to impart harmonic motion to the cam follower, which we have defined as the oscillator 44. The cam member 42 which has been used with great success in one particular embodiment of the present invention is illustrated in FIGURE 5 of the drawing. It can there be seen that this particular embodiment of cam member 42 is provided with three high lobes and has a peripheral configuration or contour which may be defined as the conjugate curve generated by a rotative simple harmonic motion oscillator on a continuously rotating plane. The particular cam of FIGURE 5 is merely illustrative, and it will be understood by those skilled in the art that a greater or smaller number of lobes may be provided. It will further be understood that the cam member 42 may be contoured to provide oscillation either in the plane of the cam or at right angles to the plane of the cam by altering its configuration and the axis of the oscillator. The only limitation with respect to the present invention is that the shape of the cam configuration must be such that with equal increments of rotation, the motion of the pole piece cam follower must be a simple harmonic motion.

This magnetic interaction between the cam 42 and the oscillator pole pieces is facilitated by a magnetic rim 72 which forms the outer part of the cam 42. Preferably, the rim of magnetic material 72 should be of constant cross-section, and the hub and web of the cam 42 should be of non-magnetic material, as for example brass. It will be appreciated by those skilled in the art that the magnetic rim 72, may be formed of either a permanent magnet material or a temporary magnet material, as desired. It also will be appreciated that the magnetic cam, or the oscillator follower assembly, or both, may be formed of permanently magnetized material. The pole pieces 52 and 54 may be formed with a generally triangular shape, as particularly shown in FIGURE 5, having a pair of pole piece faces 74 and 76 spaced from each other and spaced from the magnetic rim 72 of the cam 42.

It can now be understood that the rotation of the cam 42, upon rotation of the output shaft 12 and disk 10, sets up a magneic interaction between the cam and the pole pieces to place the magnetic oscillator into oscillation. In accordance with another feature of this invention, each of the pole pieces 52 and 54 are provided with a recessed portion 80 along a peripheral edge thereof, which recessed portion 80 receives a tickler pin 82, formed of a non-magnetic material such as brass. As particularly shown in FIGURE 2, the tickler pin 82 extends across the width of the magnetic oscillator sub-assembly 44 between the pole pieces and is soldered or otherwise attached to the sides of both pole pieces with sufficient clearance to just touch the high lobes of the cam 42. This enhances the starting movement of the oscillator which subsequently builds up to its natural frequency due to the magnetic interaction so that it can lock the shaft and disk in at the desired frequency.

In a highly successful embodiment of the invention which has been constructed and tested, the brass tickler pin was soldered to a position of the pole pieces such that when the oscillator amplitude exceeded .001 inch, the pin no longer touched the cam lobes and the oscillation built up as a result of the magnetic interaction.

In accordance with a still further feature of this invention, the natural frequency of oscillation for the oscillator sub-assembly may be adjusted as desired to enable the regulating speed of the disk to be selected. Towards this end, a torsion spring 46 is anchored at one end to the hollow oscillator staff 56 and is secured at its other end to an end wall 84 of the oscillator bracket 70. The oscillator natural frequency is varied by varying the effective length of the torsion spring 46, and towards this end, a non-magnetic adjusting block 48 is slidably associated with the torsion spring 46. As particularly shown in FIGURES 3 and 4 of the drawing, the adjusting block 48 is slidably disposed on the oscillator bracket 70 and is provided with a suitable set screw or fastener 86 to secure the adjusting block 48 in a chosen position on the oscillator bracket 70. The upper portion of the adjusting block 48 is provided with a slot or channel of sufficient width to receive the torsion spring 46 therewithin. The torsion spring is engaged at opposite sides thereof by a suitable boss 88 and by a set screw 90 which may be turned to tighten the adjusting block to the torsion spring after the tuning position is selected, or which may be loosened to permit the adjusting block to be moved relative to the torsion spring to select a different position for causing the oscillator to oscillate at a different natural frequency of oscillation.

In an illustrative embodiment of the invention actually constructed and tested, the torsion spring 46 was formed of a temperature compensating spring material, such as that known as NiSpan–C, to minimize any effect of thermal variations in the natural frequency of oscillation. Further, in this particular embodiment, the spacing between each pole face and the cam surface was approximately .003 inch. Tests of this particular embodiment of the invention showed that the acceleration time of the oscillator to get to the locking frequency for regulating shaft and disk was extremely small and that once the oscillator was locked in at its natural frequency, the speed of a rotating disk was closely regulated within narrow variation tolerances.

While there has been shown and described a specific embodiment of the present invention, it will, of course, be understood that various modifications and altenrative constructions may be made without departing from the true spirit and scope of the invention. Therefore, it is intended by the appended claim to cover all such modifications and alternative constructions as fall within their true spirit and scope.

What is claimed as the invention is:

The improvement of a magnetic speed regulator assembly for governing the speed of a rotating member comprising a rotatable shaft, a member mounted on said shaft for rotation therewith, drive motor means and means coupling said drive motor means to said rotatable shaft for rotating said shaft and member upon operation of said drive motor means, cam means having a magnetic rim portion mounted on said shaft for rotation therewith, a cam follower oscillator comprising a magnet, a pair of pole pieces secured to opposite poles of said magnet and positioned closely adjacent opposing faces of the magnetic rim portion on said cam means such that said cam follower oscillates with a simple harmonic motion in response to equal increments of rotation of said cam means, each of said pole pieces having a recessed portion on a peripheral edge thereof, with said pole pieces being secured to said magnet so as to position said recessed portions in linear alignment with each other, and an elongated pin of non-magnetic material extending between said pole pieces and mounted in said recessed portions at a position for enabling said pin to touch the high lobes of said cam means upon rotation of the latter to initiate the oscillation of the oscillator so that it can more easily lock in at its natural frequency, the rotational speed of said rotatable shaft and member being regulated by the magnetic interaction of the cam means and cam follower oscillator, and selectively adjustable tuning means operatively associated with said cam follower oscillator for enabling the oscillation frequency of said oscillator to be adjusted as desired.

References Cited by the Examiner

UNITED STATES PATENTS

| | | | |
|---|---|---|---|
| 1,663,890 | 3/1928 | Stoller | 317—5 X |
| 2,898,537 | 8/1959 | Cluwen | 218—302 |

SAMUEL BERNSTEIN, *Primary Examiner.*